United States Patent [19]

Ito

[11] Patent Number: 5,218,477

[45] Date of Patent: Jun. 8, 1993

[54] ZOOM LENS SYSTEM

[75] Inventor: Takayuki Ito, Tokyo, Japan

[73] Assignee: Asahi Kogaku Kogyo K.K., Tokyo, Japan

[21] Appl. No.: 850,938

[22] Filed: Mar. 13, 1992

[30] Foreign Application Priority Data

Mar. 18, 1991 [JP] Japan .................. 3-128915

[51] Int. Cl.⁵ .............................. G02B 15/14
[52] U.S. Cl. ................................. 359/689
[58] Field of Search .................. 359/689, 685

[56] References Cited

U.S. PATENT DOCUMENTS 4,647,160 3/1987 Ikemori .................. 359/689 X
5,062,695 11/1991 Iwasaki ...................... 359/689

FOREIGN PATENT DOCUMENTS 54-26754 2/1979 Japan .
60-120311 6/1985 Japan .
61-240217 10/1986 Japan .

Primary Examiner—Scott J. Sugarman
Attorney, Agent, or Firm—Sughrue, Mion, Zinn, Macpeak & Seas

[57] ABSTRACT

The improved zoom lens system comprises, in order from the object side, a negative first lens group to maintain a constant focal position, a positive second lens group to control zooming, and a negative third lens group to operate as a relay lens unit. The third lens group moves towards the object during zooming from the wide-angle position to the middle-angle position and towards the image plane during zooming from the middle-angle position to the narrow-angle position. This three-group lens system is compact in overall size and can suppress the aberrational variations associated with zooming.

7 Claims, 2 Drawing Sheets

ZOOM LENS SYSTEM

BACKGROUND OF THE INVENTION

This application is based on and claims priority from Japanese Application No. HEI 3-128915 filed Mar. 18, 1991, the disclosure of which is incorporated herein by reference.

The present invention relates to a zoom lens system having three lens groups that is primarily intended to be used with still cameras.

Conventional zoom lens systems include a fixed third lens group having a weak optical power, such, as disclosed in Unexamined Published Japanese Patent Application No. 120311/1985 (example 1) and No. 240217/1986 (example 2). An alternative conventional system moves the third lens group monotonically, such as disclosed in Unexamined Published Japanese Patent Application No. 26754/1979 (example 3).

However, in the zoom lens systems of examples 1 and 2, when the overall lens length is reduced during a zoom operation (i.e. when the system is between from a narrow-angle lens position to a wide-angle lens position) astigmatism varies. If these systems are set to provide zero astigmatism when the zoom is positioned at the narrow and wide-angle end positions, examples 1 and 2 experience negative astigmatism when the zoom moves between these end positions (i.e through the middle-angle position).

In each of the conventional zoom lens systems disclosed in examples 1 and 2 above, the second lens group must move a much larger distance than the first lens group when zooming to the narrow-angle end position. This motion differential excessively complicates the mechanism for performing focusing and zooming operations in a "one-hand" lens barrel, since both operations are performed with a single adjusting ring.

The zoom lens system of example 3, which moves the third lens group monotonically (i.e. in one direction as the zoom moves between narrow and wide angle end positions), requires a bulky overall lens system and a large number of lens to achieve a wide range of lens movement.

SUMMARY OF THE INVENTION

The present invention is intended to overcome the above noted deficiencies by providing a three-group zoom lens system having a compact overall size and that suppresses aberrational variations during zooming operations.

The present invention attains this objective with a zoom lens system comprising, in order from the object side, a negative first lens group to maintain a constant focal position, a positive second lens group to perform zooming operations, and a negative third lens group to function as a relay lens unit. The third lens group moves towards the object during the portion of a zooming operation, in which the zoom moves from a wide-angle end position to a middle-angle position. The third lens group moves toward the image (i.e. in the opposite direction) during the portion of a zooming operation, in which the zoom moves from the middle-angle position to the narrow-angle end position. Further, the second lens group moves toward the object while the zoom moves toward the narrow-angle position.

DETAILED DESCRIPTION OF THE PREFERRED EMBODIMENT

Figure 1:
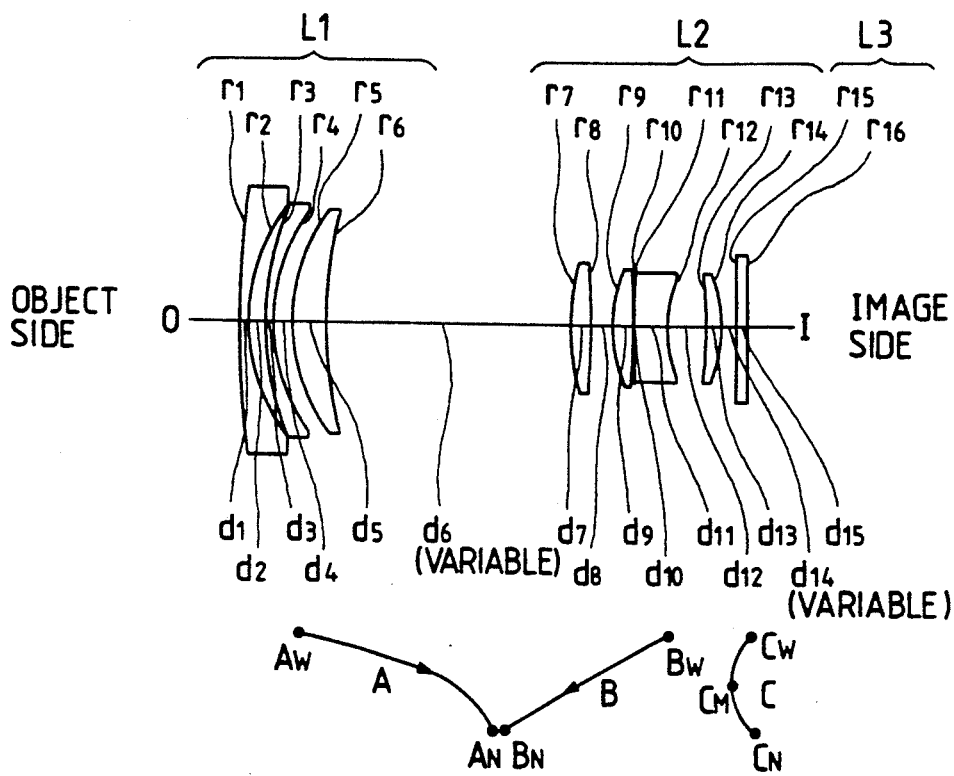
FIG. 1 is a simplified cross-sectional view of a zoom lens system according to the present invention at the wide-angle end position.

The present invention is described below with reference to FIGS. 1–4. FIG. 1 represents a simplified cross-sectional view of the present zoom lens system positioned at the wide-angle zoom position.

The lens system in FIG. 1 comprises, in order from the object side O and along an axis running between the object side O and image side I, a negative first lens group L1, a positive second lens group L2 and a negative third lens group L3. The third lens group L3 moves (as shown by line C) towards the object O when a zoom operation moves the lens system from a wide-angle end position to the middle-angle position. Line C illustrates that the third group's locus moves from point Cw to point Cm during this motion.

Once the zoom system passes the middle-angle position and begins moving away from the middle-angle position and toward the narrow-angle end position, the third group L3 reverses direction and begins moving toward the image side I (i.e. the locus moves from point Cm to point Cn).

Arrows A and B illustrate the motion of lens groups L1 and L2, respectively. As the lens system moves between the wide-angle and narrow-angle end positions, the first lens group moves between points Aw and An, while the second lens group moves between points Bw and Bn.

Moving the lens groups in this manner enables the length of the overall lens system to be shortened, while still suppressing astigmatism variations during zooming. Reversing the direction of the third lens group's movement at the middle-angle position reduces the range of movement, thereby making the lens system compact in overall size.

In order to achieve lens movement suitable for a "one-hand" lens barrel, the locus of movement of the first lens group is designed to have no point of inflection (as illustrated by arrow A). The present system also reduces the ratio of movement between the first and second lens groups, by shortening the distance the second lens group moves.

The present lens system is designed to satisfy the following conditions:

$$0.8 < m2L < 1.0 \qquad (1),$$

$$0 < m3M - m3L < 0.05 \qquad (2),$$

where m2L denotes the lateral magnification of the second lens group when the system is positioned at the narrow-angle end position; m3L denotes the lateral magnification of the third lens group when the system is positioned at the narrow-angle end position; and m3M denotes the lateral magnification of the third lens group when the system is positioned at the middle-angle position.

If the upper limit of condition (1) is exceeded, the first lens group must be moved along a complicated locus of motion, which will include a point of inflection (i.e. a reversal in direction at an intermediate focusing point). This complex motion prevents construction of a "one-hand" lens barrel that uses a simple moving mechanism. Accordingly, the upper limit of condition (1) is essential. If the lower limit of condition (1) is not reached, the optical power of the first and second lens groups are reduced and the overall lens length must be increased to compensate for this loss in power to attain a desired zoom ratio.

Condition (2) specifies the difference between m3M (i.e. the lateral magnification of the third lens group when at the middle-angle position) and m3L (i.e. the lateral magnification of the third lens group when at the narrow-angle end position). When condition (2) is satisfied, the ratio of movement between the first and second lens groups, while the system zooms from the middle-angle position to the narrow-angle end position, is much smaller than the ratio of movement between first and second groups in examples 1 and 2 above. This reduced ratio of movement in the present system makes it possible to achieve lens movement more suitable for a "one-hand" lens barrel.

If the upper limit of condition (2) is exceeded, the movement of the third lens group becomes excessive, thereby producing over-corrected astigmatism when zoom is at the middle-angle position. If the lower limit of condition (2) is not reached, the ratio of movement of the second lens group to movement of the first lens group when moving the second group toward the narrow-angle end is greatly increased.

The present system is also constructed to meet the following condition:

$$-0.3 < \Delta X1L/\Delta X2L < -0.07 \quad (3),$$

where $\Delta X1L/\Delta X_2L$ denotes the motion ratio between the first and the second lens groups when the system zooms toward the narrow-angle end position. Specifically, $\Delta X1L$ represents an amount the first lens group moves, and $\Delta X2L$ represents an amount the second lens group moves while zooming from a middle-angle position to a narrow-angle end position.

If the upper limit of condition (3) is exceeded, the movement of the second lens group becomes excessive compared to the movement of the first lens group. This excessive motion is not suitable for a "one-hand" lens barrel. If the lower limit of condition (3) is not reached, the power of the first lens group is so small that the overall lens length must be increased in order to attain a desired zoom ratio.

By satisfying conditions (1)-(3) an improved lens arrangement can be provided that has the following characteristics: the locus of movement of the first lens group has no point of inflection; the first and the second lens groups have sufficiently large optical power; the ratio of the movement between the first and second lens groups while zooming toward the narrow-angle end position is small; and the lens system is suitable for use in a "one-hand" lens barrel.

To achieve a compact lens system, the present invention also satisfies the following condition:

$$1.0 < m2L \cdot m3L \quad (4),$$

where m2L and M3L denote the lateral magnification of the second and the third lens groups, respectively, when the system is at the narrow-angle end position. If this condition (4) is not satisfied, the amount of movement of the second lens group is increased to such a degree that it is impossible to reduce the overall size of the lens system.

Further, in order to lower the manufacturing costs by composing the third lens group of a single negative lens element, the present system satisfies the following condition:

$$m3L < 1.13 \quad (5),$$

If this condition (5) is not met and a third lens group is used that has a single element, this single element group will increase the aberrations caused in the first and the second lens groups. Thus, at least two lens elements must be used in the third group to achieve effective aberration correction when condition (5) is not met.

Specific numerical data for the present system are shown in Tables 1 and 2 below. In Table 1, r denotes the radius of curvature of an individual lens surface, d denotes the thickness of an individual lens or the airspace between adjacent lenses, n denotes the refractive index of an individual lens, and $v$ denotes the Abbe number of an individual lens. The focal length (f), the F number (FNO), the half-view angle ($\omega$) and the back focus (fb) of the present system are listed in Table 2. In Table 2, column A corresponds to the lens positioning of FIG. 1 where the zoom is at the wide-angle end position, column B corresponds to the lens positioning where the zoom is at the middle-angle position, and column C corresponds to lens positioning where the zoom is at the narrow-angle end position (i.e. the telephoto position).

Figure 2:
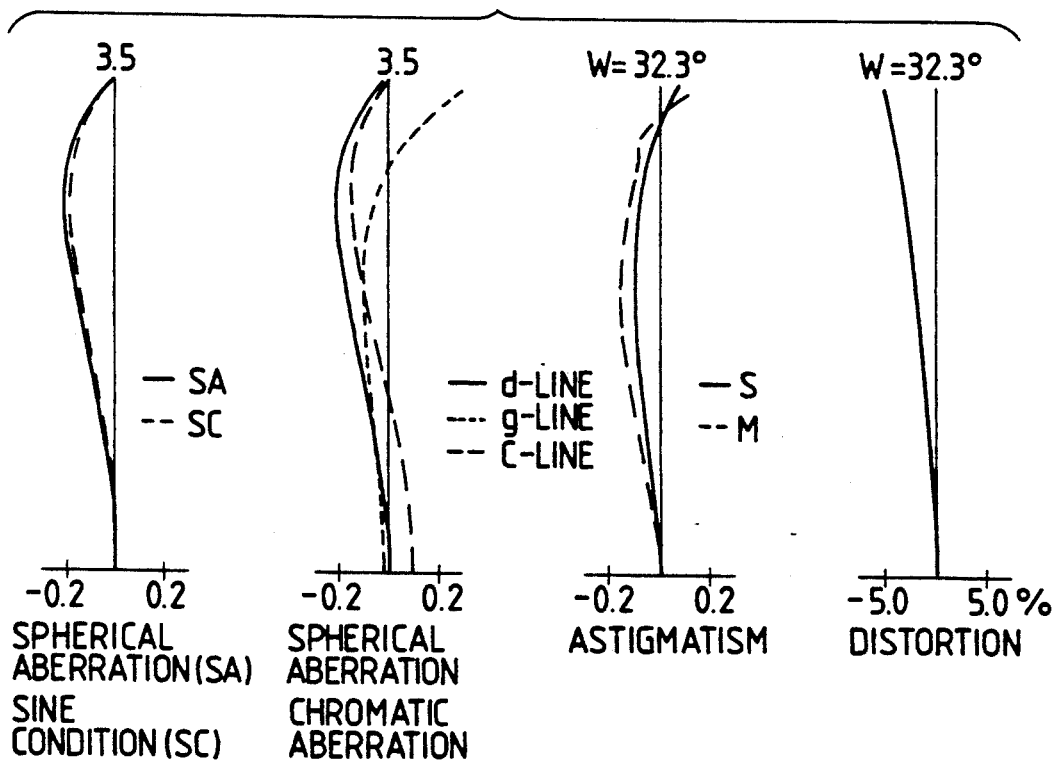
FIG. 2 is a graph plotting the aberration curves obtained with the zoom lens system of FIG. 1 when the third group is at the wide-angle end position.
Figure 3:
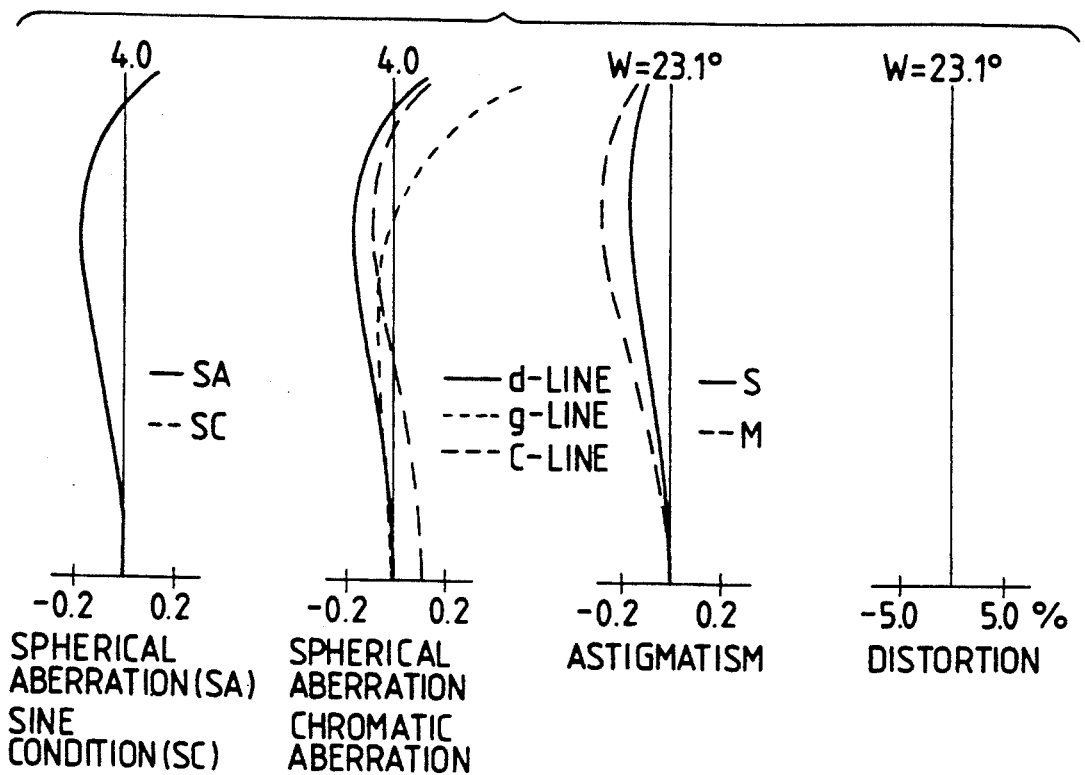
FIG. 3 is a graph plotting the aberration curves obtained with the zoom lens system of FIG. 1 when the third group is at the middle-angle position.
Figure 4:
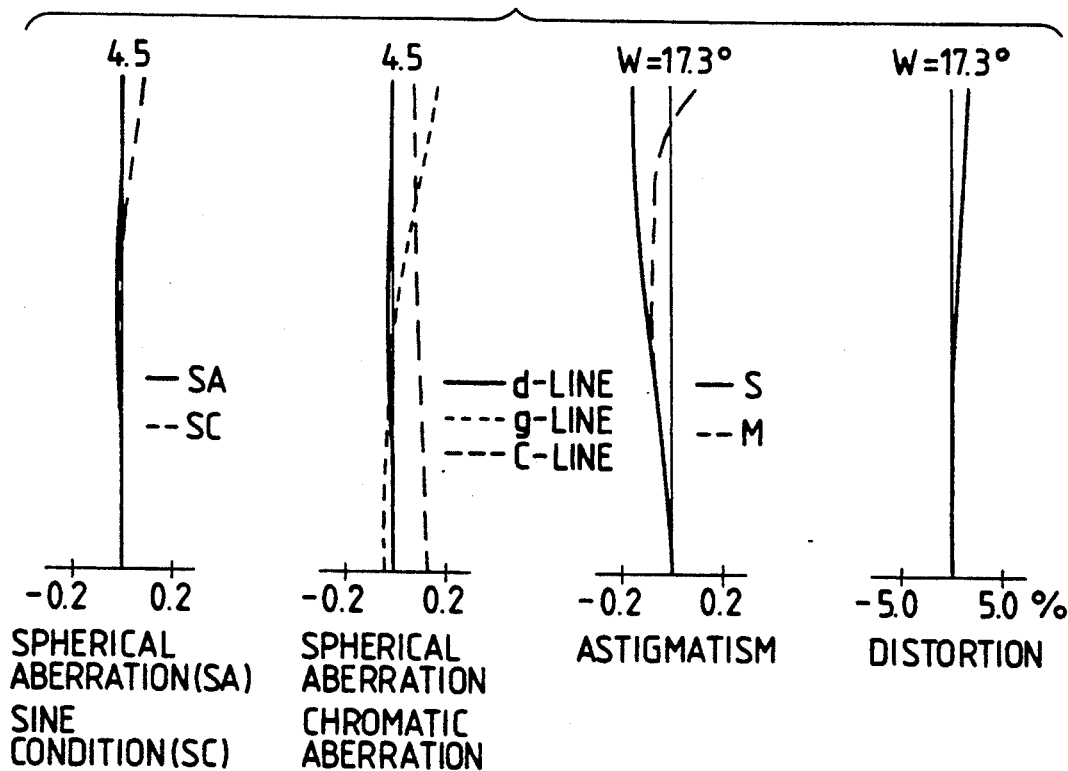
FIG. 4 is a graph plotting the aberration curves obtained with the zoom lens system of FIG. 1 when the third group is at the narrow-angle end position.

FIGS. 2-4 represent graphs plotting the aberration curves obtained with the present lens system when the lens groups are positioned at the wide-angle, middle-angle and narrow-angle positions, respectively.

The values listed below satisfy conditions (1)-(5):

| | |
|---|---|
| m2L = 0.98 | (1) |
| m3M − m3L = 0.01 | (2) |
| $\Delta X1L/\Delta X2L$ = 1.06 | (3) |
| m2L·m3L = −0.18 | (4) |
| m3L = 1.08 | (5) |

As described above, the present invention provides a zoom lens system that suppresses astigmatism variation when performing zooming operations and shortens the overall lens length. It also reduces the necessary range of movement of the third lens group to further reduce the system's overall size.

When the relevant conditions are satisfied, a lens motion can be realized that is suitable for a "one-hand" lens barrel which performs both focusing and zooming by manipulating one adjusting ring.

TABLE 1

| Surface No. | r | d | n | v |
|---|---|---|---|---|
| 1 | 115.870 | 1.65 | 1.83400 | 37.2 |
| 2 | 26.538 | 2.20 | | |
| 3 | 39.330 | 1.53 | 1.77250 | 49.6 |
| 4 | 26.570 | 2.75 | | |

TABLE 1-continued

| Surface No. | r | d | n | v |
|---|---|---|---|---|
| 5 | 26.597 | 4.46 | 1.80518 | 25.4 |
| 6 | 52.948 | (variable) | | |
| 7 | 30.766 | 3.03 | 1.71300 | 53.8 |
| 8 | −118.528 | 2.70 | | |
| 9 | 20.453 | 2.84 | 1.72000 | 43.7 |
| 10 | 181.433 | 0.53 | | |
| 11 | −92.385 | 4.19 | 1.80518 | 25.4 |
| 12 | 16.051 | 5.49 | | |
| 13 | −55.592 | 2.04 | 1.68893 | 31.1 |
| 14 | −23.455 | (variable) | | |
| 15 | −500.003 | 1.50 | 1.51633 | 64.1 |
| 16 | 500.003 | | | |

TABLE 2

| | A | B | C |
|---|---|---|---|
| f | 36.00 | 50.34 | 68.00 |
| FNO | 1:3.5 | 1:4.0 | 1:4.5 |
| ω | 32.3° | 23.1° | 17.3° |
| fb | 37.80 | 41.32 | 37.80 |
| d6 | 35.04 | 15.08 | 1.50 |
| d14 | 2.28 | 6.71 | 19.27 |

(1) m2L = 0.98
(2) m3M − m3L = 0.01
(3) ΔX1L/ΔX2L = 1.06
(4) m2L · m3L = −0.18
(5) m3L = 1.08

I claim:

1. A zoom lens system comprising, in order from an object side to an image side:
a negative first lens unit for maintaining a constant focal position, a positive second lens unit movable along an axis running between an object and image for performing zooming operations, and a negative third lens unit movable along said axis for functioning as a relay lens unit,
said third lens unit moving along said axis towards the object during a zooming operation in which the zoom moves from a wide-angle end position to a middle-angle position, said third lens unit moving along said axis toward the image during a zooming operation in which the zoom moves from a middle-angle position to a narrow-angle end position.

2. A zoom lens system according to claim 1 which satisfies the following conditions:

$$0.8 < m2L < 1.0 \quad (1)$$

$$0 < m3M - m3L < 0.05 \quad (2),$$

where m2L represents a lateral magnification of the second lens unit when said system is positioned at the narrow-angle end position, m3L represents a lateral magnification of the third lens unit when said system is positioned at the narrow-angle end position, and m3M represents a lateral magnification of the third lens unit when said system is positioned at the middle-angle position.

3. A zoom lens system according to claim 2 which further satisfies the following condition:

$$-0.3 < \Delta X1L/\Delta X1L < -0.07 \quad (3),$$

where ΔX1L represents an amount the first lens unit moves, and ΔX2L represents an amount the second lens unit moves while zooming from a middle-angle position to a narrow-angle end position.

4. A zoom lens system according to claim 1 which satisfies the following condition:

$$1.0 < m2L \cdot m3L \quad (4),$$

where m2L represents a lateral magnification of the second lens unit at the narrow-angle end position and m3L represents a lateral magnification of the third lens unit at the narrow-angle end position.

5. A zoom lens system according to claim 1 wherein the third lens unit is composed of a single negative lens element that satisfies the following condition:

$$m3L < 1.13 \quad (5),$$

where m3L represents a lateral magnification of the third lens unit at the narrow-angle end position.

6. A zoom lens system according to claim 1 wherein the second lens unit moves toward the object during zooming operations between the wide-angle end position and the narrow-angle end position, and the first lens unit moves toward the image during a zooming operation from the wide-angle end position to the narrow-angle position.

7. A zoom lens system according to claim 1 wherein the third lens unit consists of a single negative lens element.

* * * * *